Oct. 15, 1968  J. A. I. YOUNG  3,406,347
CIRCUIT FOR MODIFYING AN ELECTRICAL SIGNAL
Filed Jan. 14, 1965  3 Sheets-Sheet 1

INVENTOR.
JOHN A. I. YOUNG
BY

# United States Patent Office 3,406,347
Patented Oct. 15, 1968

3,406,347
CIRCUIT FOR MODIFYING AN
ELECTRICAL SIGNAL
John A. I. Young, Peterborough, Ontario, Canada, assignor to Canadian General Electric Company Limited, Toronto, Ontario, Canada, a corporation of Canada
Filed Jan. 14, 1965, Ser. No. 425,530
2 Claims. (Cl. 328—143)

ABSTRACT OF THE DISCLOSURE

An electrical circuit arrangement for accepting an alternating current signal including a rectifier and a comparing circuit for matching rectified signal values with direct current biases according to a predetermined calibration with means for combining the resultant signals to a modulator for modifying the original alternating current signals to derive a new calibration including the method for adapting such apparatus to recalibrating an elasticity curve of a metals rolling mill.

---

This invention relates to an electrical circuit for extending the linear portions of an electrical signal into its nonlinear range.

The use of automatic means for controlling the gauge of a strip of metal being rolled in a metal rolling mill, e.g., a steel mill, is now well known. One system of this kind is known as the BISRA system; this particular system makes use of the loading in the mill housing as a signal source to control roll separation. On passing between the rolls, the strip loads the mill housing, and as is well known, loading the housing causes it to stretch; initially, the stretch is not proportional to the loading, but after the housing has been loaded to a certain point, the relationship becomes linear. Since the BISRA system depends on roll force or loading of the mill housing for signals representing roll separation, roll forces not directly proportional to housing stretch are unsuitable for control purposes. Therefore, in the event the mill is to be operated in the nonlinear region of the roll force-mill stretch curve, as it may sometimes be, corrections must be introduced. The novel circuit to be described with reference to the drawings, reshapes the upper end portion of the nonlinear curve to near linear, in effect, extending the linear portion of the curve into the nonlinear region, thereby extending downward the range of operation of the automatic gauge control system.

Figure 1:
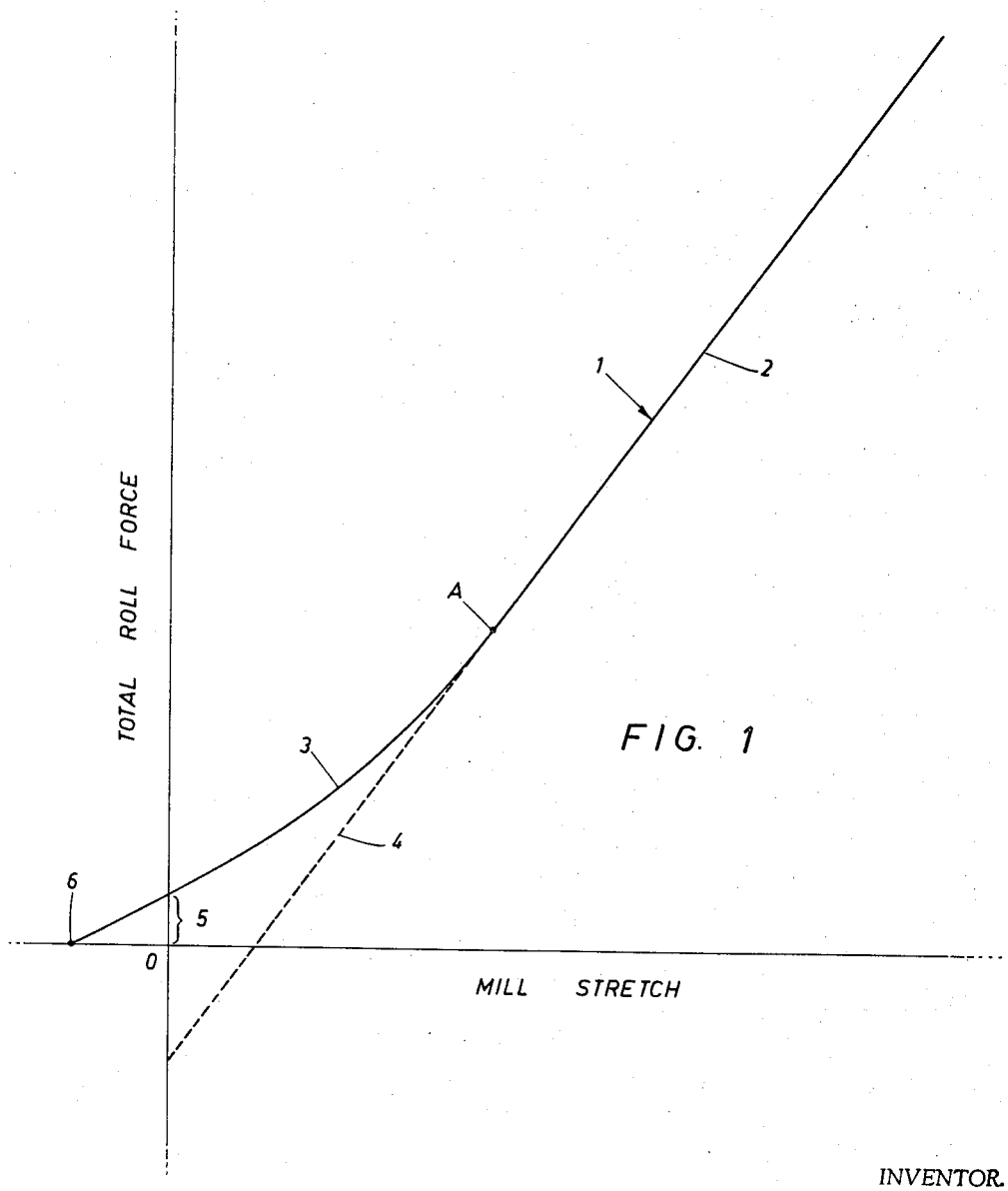
FIGURE 1 is a graph showing the relationship between roll force and mill stretch in a metal rolling mill.

Referring now to FIGURE 1, curve 1 shows the relation between total roll force and mill stretch in a metal rolling mill, such as a steel mill. As the roll force is applied beginning at point 6 on the curve, no extension of the mill housing can be detected until the force exceeds the value indicated at 5, after which increasing the force further causes the mill housing to stretch, but the relationship between force and stretch is nonlinear until point A is reached; after point A, the relation becomes linear and remains so for the remaining roll forces. Normally the mill will operate on the linear portion 2 above point A of the curve, but in some cases it may be desirable or even necessary to operate the mill below point A in the nonlinear region 3. In the BISRA system to which this invention appertains, accurate control of gauge depends upon a linear relation between roll force and mill stretch, and consequently, operating the mill in the nonlinear region of the curve will introduce intolerable errors into the control system, errors which will progress in magnitude as curve 3 deviates from the straight line relation illustrated by the dashed line 4 which line is an extension downward of the straight line 2. Therefore, to operate satisfactorily below point A, it is necessary to modify curve 3 so that portion of the curve on which operation is to take place approximates the straight line extension indicated at 4.

A novel circuit which in effect extends the straight line portion 2 of curve 1 down an appreciable distance from point A along approximately the extension shown at 4 will now be described with reference to FIGURES 2 and 3. This circuit reshapes an appreciable length of the upper end of the nonlinear portion 3 into a new curve 7 which deviates very little from line 4 from the points A to B, but after crossing the line at point B, it deviates increasingly from the straight line. Hence a significant length A to B at the upper end of portion 3 has been straightened sufficiently that for purposes of mill control it can be regarded as a downward extension of the linear portion 2 to a little below point B, and as a result, the linear range of mill control has been extended into the region which was formerly nonlinear.

Figure 2:
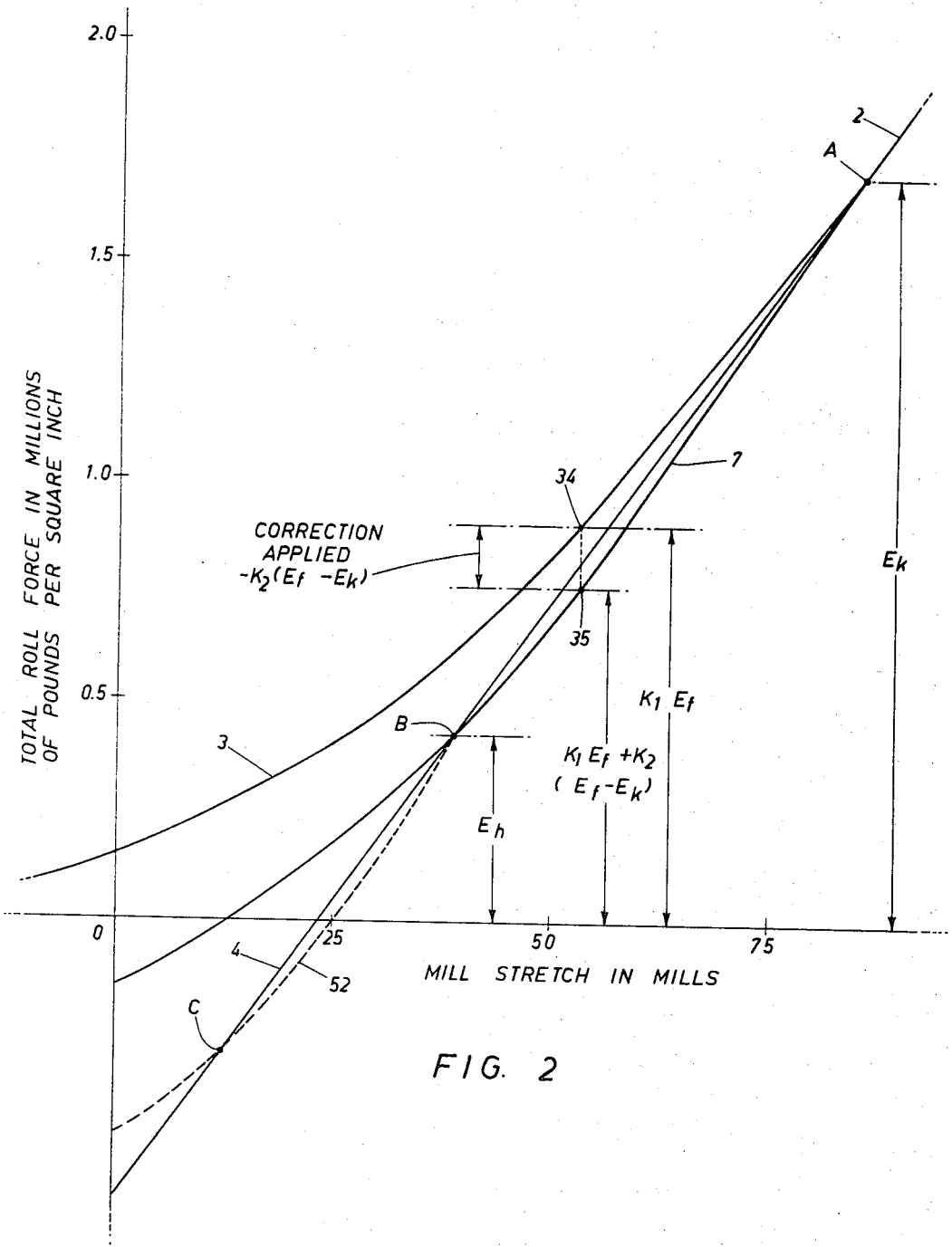
FIGURE 2 is a graph showing the nonlinear portion of the FIGURE 1 curve and the corrections applied thereto by the circuit shown in FIGURE 3.
Figure 3:
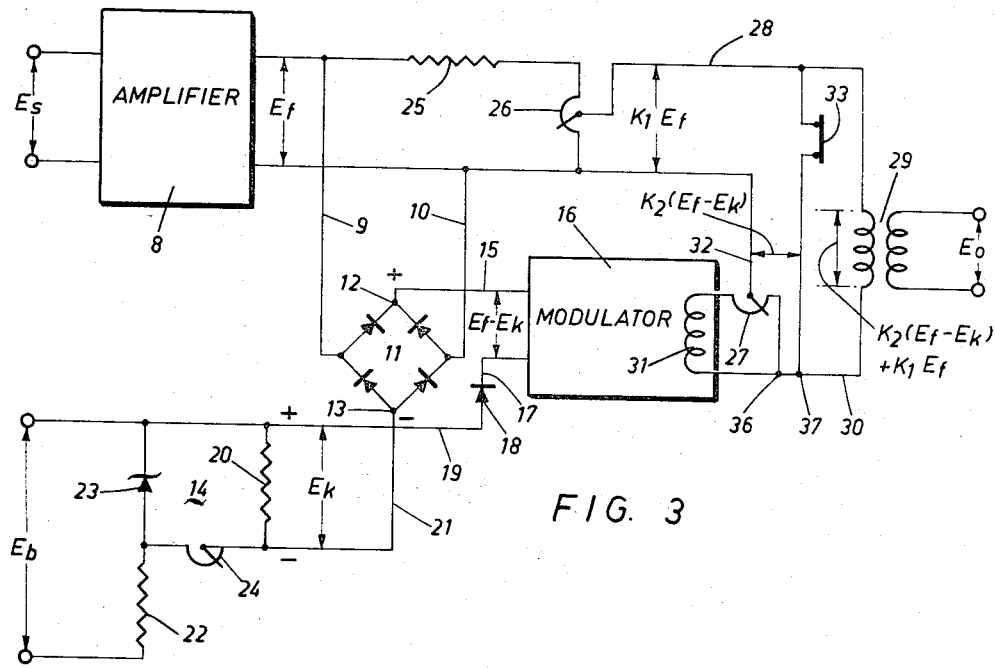
FIGURE 3 is a circuit for modifying the nonlinear portion of the curve as illustrated in FIGURE 2.

In the embodiment of the invention illustrated in FIGURE 3, the direct current signal representing roll force and normally obtained from the load cells mounted in the mill housing is converted to 400 cycle square wave alternating current represented as $E_s$, the input signal to amplifier 8. The output voltage $E_f$ from the amplifier is fed by way of leads 9 and 10 to a bridge rectifier 11 where it is converted into direct current of the polarity indicated at terminals 12 and 13 of the full wave rectifier network. Terminals 12 and 13 are connected to a circuit including the following elements: lead 15, the input side of modulator 16, lead 17, rectifier diode 18, lead 19, resistor 20 and lead 21. Although these elements complete a circuit between terminals 12 and 13, no rectified current from rectifier 11 can flow in the circuit because diode 18 blocks such flow. A bias network 14 applies across resistor 20 a constant D.C. voltage $E_k$ which has a polarity opposite to the polarity of the rectified voltage $E_f$ appearing at terminals 12 and 13; hence, the voltage $E_k$ opposes the D.C. equivalent of voltage $E_f$. Therefore, the input to the modulator may be represented as a positive voltage from the amplifier and a negative voltage from the bias circuit, that is $E_f - E_k$. The circuit for combining voltages $E_f$ and $E_k$ will be referred to hereinafter as a summing circuit. When voltage $E_k$ exceeds the D.C. equivalent of $E_f$, diode 18 will conduct and allow current to flow in the circuit including modulator 16; the output from the modulator will be combined with a signal from the amplifier in another summing circuit to provide the modified signal illustrated by curve 7 in FIGURE 2. As will be pointed out later, the circuit shown in FIGURE 3 will be calibrated such that there will be an output signal from the modulator only when the mill is operating below point A on curve 1; above point A, the D.C. equivalent of $E_f$ exceeds $E_k$, thereby rendering bias circuit 14 ineffective by virtue of the blocking action of diode 18.

The constant voltage $E_k$ is obtained from a D.C. source $E_b$ connected across a voltage dropping resistor 22 in series with a potentiometer 24 and resistor 20 and with a Zener diode 23 connected across the series combination of potentiometer 24 and resistor 20. This is a well known voltage stabilizing circuit that provides an output voltage $E_k$ which remains reasonably constant even though the input voltage $E_b$ varies somewhat. Voltage $E_k$ is set by means of potentiometer 24 and will, of course, be lower than voltage $E_b$; when, for example, $E_b$ is at 28 volts as indicated in FIGURE 3, $E_k$ will be at about 24 volts.

A voltage dropping network consisting of resistor 25 and potentiometer 26 connected across the output of amplifier 8 drops voltage $E_f$ to a portion $K_1E_f$ of $E_f$ set by means of the potentiometer. The voltage dropping network is used because it is simpler to provide an amplifier having an output voltage a little higher than wanted than it is to provide an amplifier having exactly the output voltage needed. Hence the voltage $E_f$ higher than wanted is reduced to the desired value $K_1E_f$ by adjusting the potentiometer. Voltage $K_1E_f$ represents roll force, and it is the voltage actually used in the control system, and corrected in the non linear region.

Modulator 16 converts its D.C. signal input $E_f-E_k$ into an A.C. signal having the same frequency, wave form and phase as signal $K_1E_f$. Since the phase of neither signal changes, the modulator can readily be adjusted to bring the two signals into step, after which they are summed algebraically in a second summing circuit. The output from the modulator can be set at a reduced value $K_2(E_f-E_k)$ by adjustment of the potentiometer 27 connected across the output terminals of the modulator. The two signals $K_1E_f$ and $K_2(E_f-E_k)$ are summed in the circuit consisting of lead 28, the primary winding of transformer 29, lead 30, the parallel combination of the output winding 31 of the modulator and potentiometer 27, and lead 32; these components connect the amplifier to the modulator such that the modulator signal is subtracted from the amplifier signal. The combined signal appears at the secondary terminals of transformer 29 and $E_o$, and it is the signal fed to the system for automatically controlling the mill. Relay contacts 33 are connected across the primary of transformer 29 for control purposes. There are times when no signal $E_o$ is wanted for mill control, and the contacts are used to activate or de-activate the circuit.

Certain adjustments must be made to the circuit shown in FIGURE 3 before it is ready for use in the remainder of the automatic gauge control system. First, the circuit is calibrated by adjusting the slider of potentiometer 26 for the proper value of signal $K_1E_f$. Next, the bias voltage $E_k$ is set to equal the voltage output $E_f$ of the amplifier at the point where this latter voltage ceases to be non linear and becomes linear, that is, at point A on the curve in FIGURE 2. Potentiometer 24 is used to set the bias voltage. Finally, the output voltage of the modulator is set by means of potentiometer 27 at the value required for locating curve 7 with respect to the straight line 4.

The voltage relationships are illustrated graphically in FIGURE 2. Point A represents the roll force signal at which the curve becomes linear, and it also represents the value $E_k$ of the bias signal supplied by circuit 14. Since curve 1 shows the relation between mill force and mill stretch, it may also be represented by the signal $K_1E_f$ plotted against mill stretch because this signal is directly proportional to mill force. When the mill is operating above point A in the straight portion 2 of the roll force-mill stretch curve when $K_1E_f$ is greater than $E_k$, there is no signal output from the modulator due to the blocking action of diode 18. As soon as operation of the mill drops below point A into the non linear portion 3 of the curve, the output signal from the modulator modifies signal $K_1E_f$ so as to define a new curve 7 which may be regarded as curve 3 swung counter-clockwise on point A to a new position aligned more closely with the linear portion 2 of curve 1. As shown in FIGURE 2, curve 7 has an appreciable length at its upper end deviating little from line 4; hence, it is now possible to operate the mill on automatic gauge control below point A down to a little below point B, B being the point where curves 7 and 4 cross. Referring again to FIGURE 2, points 34 and 35 have been selected on curves 3 and 7 respectively to illustrate the relation between the FIGURE 3 signals. Point 35 on curve 7 shows a value corresponding with point 34 on curve 3 after the correction $-K_2(E_f-E_k)$ has been applied to signal $K_1E_f$. Normally, automatic mill operation takes place on the linear portion of the roll force-mill stretch curve (portion 2), but if called upon, as it may sometimes be, mill operation automatically can now be extended down into the non linear region of the curve (portion 3).

It has been pointed out that the signal obtained from the load cells is direct current and that the direct current is converted to alternating current before it is amplified at 8. This is done because an alternating current signal can be used to control gauge as well as other equipment such as the loopers. It is possible to use the direct current signal from the load cells in the FIGURE 3 circuit by first amplifying it and then comparing it with the bias signal from circuit 14, thereby eliminating the bridge rectifier 11.

When the circuit shown in FIGURE 3 is employed to extend the linear portion of the roll force-mill stretch curve in FIGURE 2, the corrective signal may be thought of as swinging curve portion 3 counter-clockwise about point A to the new position indicated by curve 7. The new curve drops a little below the straight line 4 for some distance and then crosses it at point B, but its length A to B is so close to being a straight line that it is suitable for mill operation on automatic gauge control. If it is desired to straighten the nonlinear portion of the curve even farther, a second or even subsequent corrective signals can be introduced, each of which will in effect swing the remainder of the nonlinear curve counter-clockwise so as to bring a portion thereof into close agreement with the straight line. Obviously, it would be impractical to modify the circuit of FIGURE 3 to introduce more than one or two additional corrective signals. Although the circuit shown in FIGURE 3 has been found to give good results there may be instances when at least one more corrective signal would be advantageous.

Figure 4:
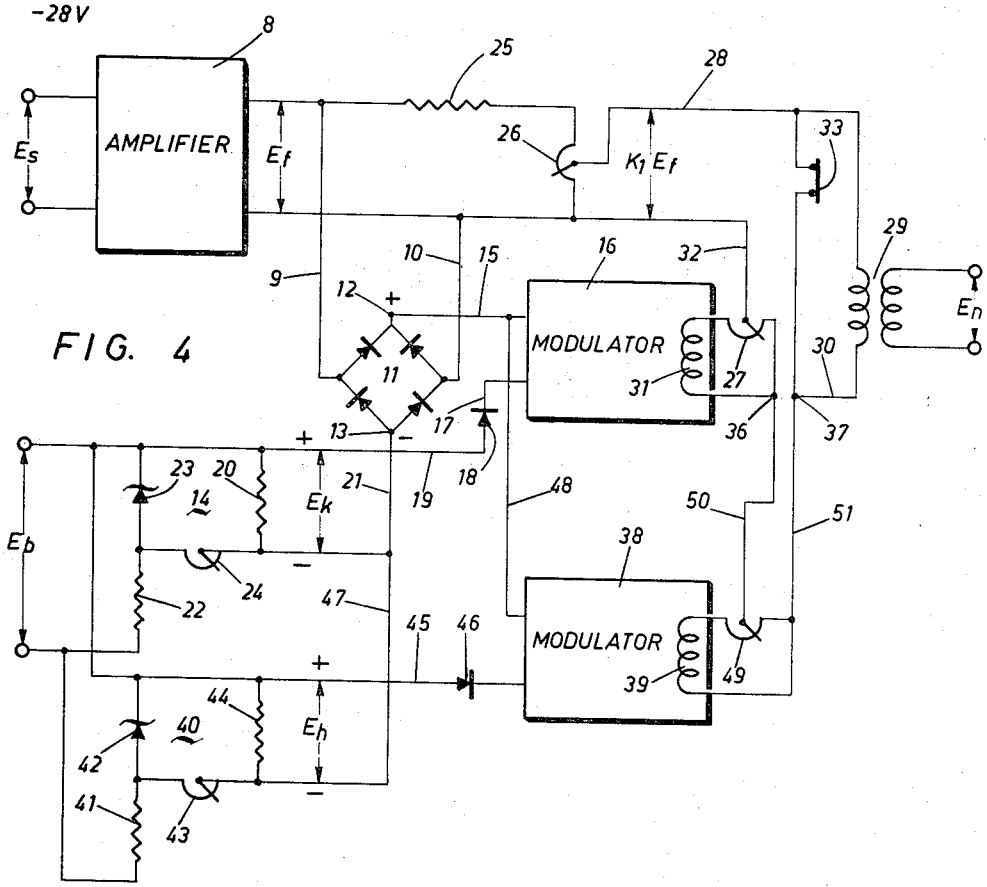
FIGURE 4 is a variation of the circuit shown in FIGURE 3 and used to further modify the nonlinear portion of the curve.

FIGURE 4 shows one simple way in which the FIGURE 3 circuit can be modified to provide a second corrective signal which will straighten the nonlinear portion 3 of the curve even farther. The modified circuit adds another stage comprising a bias circuit 40 and a modulator 38, which components are similar physically as well as functionally to components 14 and 16 respectively. Since the circuit shown in FIGURE 3 has been changed very little, the components of this circuit appearing in FIGURE 4 have been identified by the same numbers; the new numbers appearing in FIGURE 4 identify the components added.

Bias circuit 40 is a voltage stabilizing network adapted to provide a relatively constant output voltage $E_h$ which is lower in value than voltage $E_k$. This circuit includes a resistor 41 and a potentiometer 43 for reducing voltage $E_b$ to the level required, and a Zener diode 42 in combination with a resistor 44 for holding the reduced voltage constant. Bias voltage $E_h$ is set by means of the potentiometer to the value shown graphically in FIGURE 2, that is, a bias voltage equivalent to the roll force signal at point B on curve 7. In the first stage the bias level is set at point A, the beginning of linear portion 2 of the curve; in the second stage the bias level is set at point B, the cross over point of curve 7 and line 4. As in the first stage, bias voltage $E_h$ is compared with voltage $E_f$ to obtain a voltage $E_f-E_h$ at the input terminals of modulator 38. The negative side of bias circuit 40 is connected through leads 47 and 21 to the negative terminal 13 of bridge rectifier 11, and the positive side of the circuit is connected to an input terminal of modulator 39 by way of lead 45 and diode 46. The other input terminal of modulator 38 is connected through lead 48 to a corresponding input terminal of modulator 16. Diode 46 serves the same purpose in the second stage that diode 18 does in the first stage; it blocks current through the input of modulator 38 when $E_f$ exceeds $E_h$, thereby rendering the second stage inoperative. This occurs when $E_f$ is large enough that the mill operates above point B on the curves.

Modulator 38 converts its input voltage $E_f-E_h$ into an alternating voltage of the same frequency and wave form as voltages $K_1E_f$ and $K_2(E_f-E_k)$ and in phase therewith. The output of modulator 38 is connected to the output of modulator 16 by removing the lead shown between points 36 and 37 in FIGURE 3 and then connecting these points to the output of modulator 38 by means of leads 50 and 51 as shown in FIGURE 4. This connection of the two modulator outputs is such that the two modulator signals and the amplifier signal are summed algebraically; therefore, the signal impressed on the primary winding of transformer 29 is equal to $K_1E_f+K_2(E_f-E_k)+K_3(E_f-E_h)$, where $K_3(E_f-E_h)$ is the modulator output signal at potentiometer 49. As with potentiometer 27, potentiometer 49 can be set for the proper output signal $K_3(E_f-E_h)$ from modulator 38.

Referring again to FIGURE 2, when the mill is operating above point A on the linear curve portion 2, both modulators are inoperative, and when mill operation falls below point A, it first follows curve 7 from A down to B and then dotted curve 52 from B to C. After passing point C, the dotted curve soon deviates too much from line 4 to be suitable for mill operation. It will be noted from FIGURE 2, that the single stage circuit shown in FIGURE 3 extends the linear portion 2 of the curve a significant distance down to point B, and the second stage shown in FIGURE 4 increases the extension to point C or a little beyond this point. It will be noted that extension A to B is longer than B to C. This is due to the curvature of portion 3, it being nearer a straight line at its upper end than lower down. Although one stage provides sufficient extension of the linear portion of the curve for most application, the additional extension provided by the second stage may be useful for some applications.

The embodiments of the invention in which an exclusive property or privilege is claimed are defined as follows:

1. In a control system for a metals rolling mill having a stand including a pair of rolls through which metal is passed to be processed, means for applying a force to close said rolls upon said metal, and force responsive means for providing an A.C. signal representative of said force, said A.C. signal being linearly related to said force only for signal values exceeding a certain value, an electric circuit for linearizing the response of the control system for signals having values less than said certain value comprising:
   (a) a rectifier for converting a part of said A.C. signal into a D.C. signal;
   (b) a bias network including the D.C. terminals of said rectifier and a bias circuit for providing a D.C. bias signal having a magnitude approximately equivalent to said certain value, said D.C. bias signal being in series opposition to the D.C. output of said rectifier to block conduction through said rectifier when the value of said A.C. signal exceeds said certain value;
   (c) a modulator connected to said bias network and responsive to conduction of current through said rectifier for converting a signal from said network into an alternating signal of the same frequency, waveform, and phase relationship as said A.C. signal; and
   (d) a summing circuit for summing a set portion of the output signal from said modulator and a set portion of the remainder of said A.C. signal to obtain a signal for linearizing the response of said control system for values of A.C. signals less than said certain value.

2. In a control system for a metals rolling mill having pairs of rolls through which metal is passed including a load cell associated with said rolls for providing a D.C. signal representative of roll force, an electric circuit for extending the range over which said D.C. signal is linearly related to said roll force comprising:
   (a) means for converting said D.C. signal to an A.C. signal;
   (b) a rectifier for converting a part of said A.C. signal to a D.C. signal;
   (c) a bias network including the output terminals of said rectifier, a rectifier diode, and a bias circuit for providing a D.C. bias signal having a set value, the output of said bias circuit being in series opposition to the output of said rectifier to cause said rectifier diode to block conduction through said rectifier while said D.C. signal is greater than said set value;
   (d) a modulator connected to the output of said bias network for providing an alternating signal of the same frequency, waveform, and phase relationship as said A.C. signal when said rectifier is conducting; and
   (e) a summing circuit for summing a set proportion of said alternating signal from said modulator and a set proportion of said A.C. signal to linearize the relationship between said D.C. signal and said roll force whenever said D.C. signal has less than said certain value.

References Cited

UNITED STATES PATENTS

| | | | |
|---|---|---|---|
| 2,269,584 | 1/1942 | Eldredge | 73—88.5 |
| 2,276,843 | 3/1942 | Hathaway | 73—141 |
| 2,771,579 | 11/1956 | Ruge | 323—75 |
| 2,930,227 | 3/1960 | Spademan | 73—141 |
| 1,477,017 | 12/1923 | Sprague | 328—143 |
| 2,331,770 | 10/1943 | Gano | 328—143 |
| 2,363,813 | 11/1944 | Somers | 328—142 |
| 3,121,200 | 2/1964 | Sampson | 328—143 |
| 3,234,787 | 2/1966 | Ruge. | |

ARTHUR GAUSS, *Primary Examiner.*

H. DIXON, *Assistant Examiner.*